March 1, 1955 T. H. DISERENS 2,702,976
PNEUMATIC COTTON HARVESTER
Filed Aug. 5, 1952
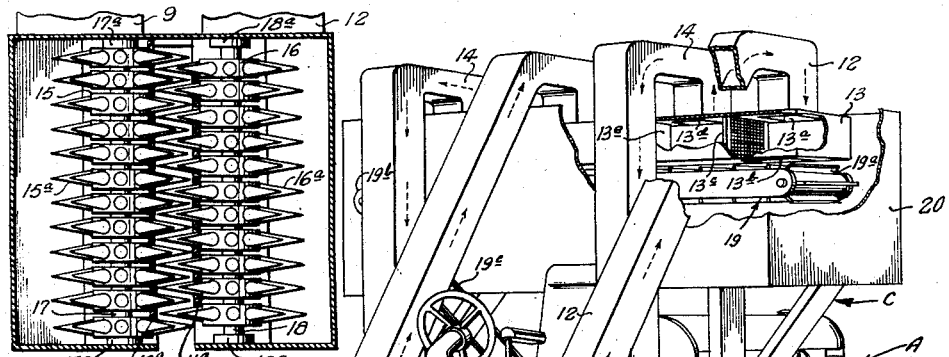
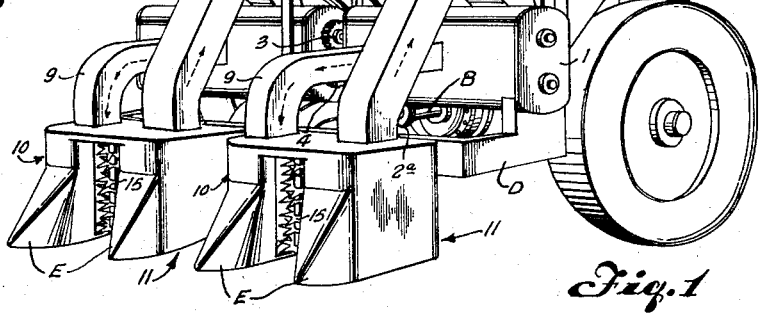
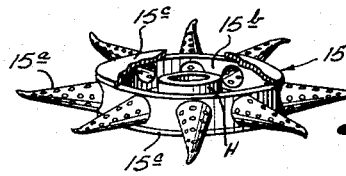
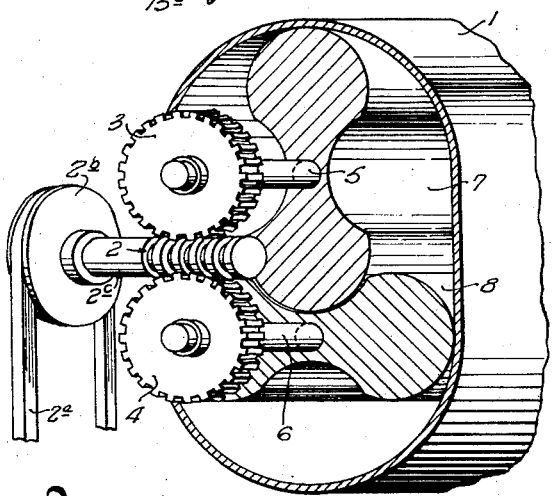
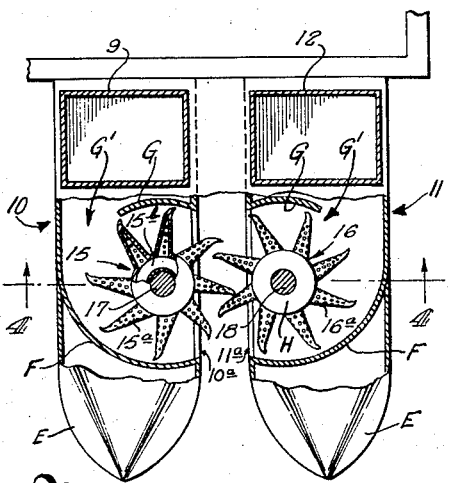
INVENTOR.
Thomas H. Diserens

United States Patent Office 2,702,976
Patented Mar. 1, 1955

2,702,976

PNEUMATIC COTTON HARVESTER

Thomas H. Diserens, Waxahachie, Tex.

Application August 5, 1952, Serial No. 302,759

6 Claims. (Cl. 56—12)

This invention relates to cotton harvesting machines and more particularly to such machines employing air below and above atmospheric pressure for harvesting and transferring cotton to a transporting receptacle.

The principal object of the invention is to provide a cotton harvesting machine which may be either self propelled or designed as an attachment for a tractor, but in either case, the machine is equipped with cotton gathering means consisting of vertically parallel pairs of shafts, each shaft carrying a group of vertically spaced, multi-fingered gathering units, the fingers of the units of one shaft interlocking with the fingers of the units of the other shaft of a pair for common rotation when the gathering units are advanced against the cotton bearing stalks as the machine is moved along the row.

Another object of the invention is to provide cooperating groups of multi-fingered cotton gathering units, the fingers of each unit being perforated for the passage of air and the units of each group being encased in a housing.

Still another object of the invention is to provide a blower for supplying air under pressure to the housing of one group of cotton gathering units for directing a stream of air through and across the units, as well as to create a suction within the housing of the companion group of gathering units, thus to intercept and carry off the cotton dislodged by the cooperating groups of gathering units and propelled by the air towards the housing wherein the suction is created.

Yet another object of the invention is to provide an airtight receptacle to which harvested cotton is transported from the gathering units by way of a suction conduit and deposited onto an endless conveyor within the receptacle which is equipped with means for separating the cotton from air, the latter being recirculated while the cotton remains in the receptacle.

A still further object of the invention is to provide a blower whose impellers are rotated in timed relationship by means of a worm gear mounted on the shaft of each impeller and driven by an intermediate worm, thus to insure proper meshing of the impellers irrespective of wear incurred by the gears.

Other objects will appear as the description proceeds, when considered with the annexed drawings, wherein:

Figure 1 is a front perspective view with parts broken away and shown in section of a cotton harvesting machine constructed according to the invention.

Figure 2 is an enlarged fragmentary perspective view with parts broken away and shown in section of one of the blowers showing the impeller timing means.

Figure 3 is a top plan view of one of the gathering assemblies and their housings, with portions broken away and shown in section.

Figure 4 is a transverse sectional view taken on line 4—4 of Figure 3, and

Figure 5 is an enlarged perspective view of one of the multi-fingered gathering units.

Continuing with a more detailed description of the drawing, reference character A designates a tractor on which the harvesting machine of the invention is mounted and which latter is driven, as will be explained later, from the power take-off B of the tractor. A frame C of any suitable design and construction supports the machine on the tractor while a portion D of the frame supports a pair of blower housings 1, arranged end to end on the frame portion D and transverse to the direction of travel of the machine in harvesting. Further reference to the blower housings and blowers therein will be made presently.

The machine shown in the drawing is a two row machine and inasmuch as the mechanisms for harvesting cotton from individual rows are identical, the parts of one have been given reference numerals identical to corresponding parts of the companion mechanism. Accordingly, each mechanism consists of a pair of housings 10 and 11 which are joined together as a unit and attached to the portion D of the supporting frame C at one end thereof opposite the companion housings enclosing the mechanism for harvesting an adjacent row. The housings 10 and 11 are spaced apart to define a plant passage and on each side of this passage is a forwardly extending and tapered guide E. These guides direct the stalks into the passage.

Within the housing 10 there is arranged a baffle F of circular criss-section which is coextensive in height with the housing 10 and confronts a like baffle G, both baffles forming a passage G' in communication with the terminus of a duct 9 which enters the top of housing 10 at its rear end and which constitutes an air pressure duct as will become apparent presently.

Within the substantially cylindrical space defined by the baffles F and G is an exhaust spindle consisting of a series of vertically spaced, multi-fingered gathering units 15, shown per se in Figure 5. Each of these gathering units is comprised of a plurality of tapered and perforated fingers 15a whose hollow bodies are joined at their large ends to an annulus 15b which latter is closed on each side by disc-shaped heads 15c. Within the annulus 15b is a hub H which surrounds a vertical shaft 17, journaled at its upper and lower ends in bearings 17a which are attached to the top and bottom of the housing 10.

The vertical series of gathering units 15 is parallel with the vertical series of identical gathering units 16 and the fingers 15a of the units 15 interlock with the fingers 16a of the units 16 across the plant passage between housings 10 and 11. A series of horizontal, vertically spaced bars 10a extend from one to the other of the baffles F and G and extend between the fingers of the gathering units of housing 10 from top to bottom thereof thus to intercept trash and plant foliage and prevent the same from being carried back into the housing 10, the fingers 15a being curved to facilitate casting off of the trash collecting thereon.

In like manner, the fingers 16a of the companion series of gathering units 16 extend between bars 11a of housing 11 and are deprived of collected trash thereby. These fingers 16a are also hollow, tapered and perforated and are so arranged in vertically spaced relation on a shaft 18 that their fingers 16a will pass between the fingers of the opposite series of gathering units, yet the spacing between the fingers of the two series of units is sufficient to permit passage of unopen bolls of cotton, permitting them to remain on the stalks for later harvesting when matured. The shaft 18 carrying the gathering units 16 is journaled in bearings 18a attached to the top and bottom of the housing 11.

It will be understood that the shafts 17 and 18 are both mounted for free rotation in their respective bearings and revolve when the gathering units 16 and 15 are advanced against the stalks when the machine travels along a row of stalks.

The blower housing 1 encloses impellers 7 and 8 having drive shafts 5 and 6, respectively. The impellers are kept in proper meshing relationship by a timing mechanism consisting of worm gears 3 and 4, mounted on shafts 5 and 6, respectively, and driven in unison by a worm 2 disposed therebetween and mounted on a laterally extending shaft 2c. Shaft 2c carries a pulley 2b, driven by a belt 2a which, in turn, is driven by a pulley mounted on the power take-off shaft B of the tractor, as shown in Figure 1. This arrangement insures proper timing of the impellers 7 and 8 irrespective of wear occurring in the gear assembly.

The assembly of gathering units 15 in housing 10 may be referred to as the "pressure units" inasmuch as the duct 9 introduces air under pressure from the discharge end of the blower into housing 10 and the companion gathering units 16 may be referred to as the "suction units" since air is drawn through duct 12 from housing 11 by the intake of the blower. In this manner, cotton loosened from matured bolls by the fingers 15a of units 15 is blown into the operating range of the fingers 16a of units 16 which latter are effective to move the cotton into the influence of suction through duct 12, whence it is carried upward and deposited into a separator duct 13 through the discharge end 13a of the duct 12.

The separator duct 13 has an opening 13b through which cotton is emptied onto an endless conveyor 19 which, together with the separator duct 13, is enclosed within a receptacle 20 supported on the frame C and which receives cotton from the harvesting assemblies of each row of cotton. The separator duct 13 is further provided with a screen 13c which separates the discharge end of the suction duct 12 from the intake end 13d of a suction duct 14 which is connected to the intake of the blower to create suction within the air tight separator duct 13 and duct 12. A partition 13e separates the separator duct into two sections, one serving the gathering mechanism for one row while the other section serves the gathering mechanism of the adjacent row.

It will be observed in Figure 1 that the conveyor 19 extends substantially the length of the receptacle 20 and operates over rollers 19a at each end, one of which has a shaft protruding from one side of the receptacle and carries a pulley 19b, over which passes a belt 19c which is driven by a pulley (not shown) mounted on the power take-off shaft B of the tractor A.

In operation, as the tractor is driven along the cotton rows, the plants pass between the housings 10 and 11 of each gathering assembly and as the fingers 15a and 16a of the gathering units 15 and 16 are advanced against the plant stalks, the units are caused to revolve. A stream of air from the blower through duct 9 will be directed across the gathering units 15 and through the perforations in the fingers 15a as the latter loosen the cotton in the open bolls. At the same time, suction created by the blower in duct 12 will cause cotton brought into its influence in housing 11 by fingers 16a, to be transported upwardly through duct 12 and deposited thereby into the separator duct 13, whence it is deposited onto the endless belt 19 for conveyance to a point for discharge into the receptacle 20. This same sequence of operations takes place in the companion assembly functioning to harvest an adjacent row of cotton.

Manifestly, the construction as shown and described is capable of some modification and such modification as may be construed to fall within the scope and meaning of the appended claims is also considered to be within the spirit and intent of the invention.

I claim:

1. In a cotton harvesting machine, a wheeled frame, a pair of housings supported on said frame having open confronting sides and spaced apart to define a plant passage, a plurality of vertically spaced, horizontal bars defining a grille over the open side of each of said housings, a vertical shaft journaled for free rotation in each of said housings, a series of cotton gathering units arranged in vertical relationship on each of said shafts, each having a plurality of radial, perforated fingers extending between the bars of said grille into said plant passage, said fingers each being of diminishing cross-section towards their outer ends and curved opposite to their direction of operative rotation, a blower having an intake and a discharge, a cotton receptacle, an air pressure duct supplying air from the discharge of said blower under pressure to one of said housings, and a suction duct connected to the intake of said blower for creating suction in the other of said housings and for transporting cotton dislodged from plants by said gathering units into said cotton receptacle.

2. In a cotton harvesting machine, a wheeled frame, a pair of housings supported on said frame and spaced apart to straddle a row of cotton, said housings having open confronting sides, a series of horizontal, vertically spaced bars over said open sides, a vertical shaft in each of said housings, a series of cotton gathering units spaced vertically on each of said shafts, having radial and perforated hollow fingers extending between said bars and into cotton stalks passing between said housings, said shafts and gathering units receiving rotation by engagement of said fingers with said stalks, a blower having an air intake and an air discharge, a cotton receptacle, mounted on said frame, an air duct connecting said blower discharge with one of said housings and its intake with said cotton receptacles to introduce air under pressure into said housing and to simultaneously discharge dust laden air from said cotton receptacle, and a second air duct connecting said blower intake with the other of said housings and with said cotton receptacle to create in said latter housing a suction effective to transport cotton dislodged by said gathering units into said receptacle.

3. In a cotton harvesting attachment for a tractor, a frame supporting said attachment on said tractor, a pair of housings spaced apart to define a plant passage and having open confronting sides, a vertical shaft freely mounted in each of said housings, a series of cotton gathering units grouped on each of said shafts and having hollow perforated fingers radially arranged thereon and extending through the open sides of said housings across said plant passage, a blower having an air intake and an air discharge, a cotton receptacle supported on said frame, a duct connecting said blower discharge with one of said housings to direct a stream of air across and through the gathering units therein toward the other said housing, a second duct connecting the intake of said blower with said cotton receptacle to exhaust dust laden air therefrom and a third duct connecting said other of said housings and said cotton receptacle to transport cotton dislodged from plants by said gathering units into said cotton receptacle by suction created in the latter through said second means.

4. The structure of claim 3, said fingers each being of diminishing cross-section toward their outer ends and curved opposite to their normal direction of rotation, and a series of bars between which said fingers are constrained to pass to divest the same accumulated foreign matter.

5. The structure of claim 3, and a cotton and air separating means in said cotton receptacle comprising a duct into which said third duct discharges and from which said second duct exhausts dust laden air, and foraminous means in said duct separating the inlet and outlet of said third and said second duct, respectively.

6. The structure of claim 5, and an endless conveyor within said cotton receptacle and below the duct therein for receiving cotton from said duct and for moving the same for discharge into said cotton receptacle.

References Cited in the file of this patent

UNITED STATES PATENTS

| | | |
|---|---|---|
| 445,786 | Kretzschmar | Feb. 3, 1891 |
| 498,133 | Mauermann | May 23, 1893 |
| 1,137,545 | Shaffer | Apr. 27, 1915 |
| 2,484,524 | Nisbet | Oct. 11, 1949 |